(12) United States Patent
Willey

(10) Patent No.: US 7,742,441 B2
(45) Date of Patent: Jun. 22, 2010

(54) APPARATUS, AND ASSOCIATED METHOD, FOR SETTING THE NUMBER OF PAGE INDICATIONS PER PAGE TO BE INCLUDED IN A QUICK PAGE MESSAGE

(75) Inventor: William Daniel Willey, San Francisco, CA (US)

(73) Assignee: Research in Motion Limited, Waterloo (CA)

( * ) Notice: Subject to any disclaimer, the term of this patent is extended or adjusted under 35 U.S.C. 154(b) by 611 days.

(21) Appl. No.: 11/466,493

(22) Filed: Aug. 23, 2006

(65) Prior Publication Data

US 2008/0051109 A1    Feb. 28, 2008

(30) Foreign Application Priority Data

Aug. 22, 2006    (EP)    .................................. 06119334

(51) Int. Cl.
*H04H 20/71*    (2008.01)
(52) U.S. Cl. ........................ 370/312; 370/432; 370/503
(58) Field of Classification Search .......... 370/320–338
See application file for complete search history.

(56) References Cited

U.S. PATENT DOCUMENTS

| | | | |
|---|---|---|---|
| 6,421,540 B1 * | 7/2002 | Gilhousen et al. | ............ 455/458 |
| 7,206,331 B2 * | 4/2007 | Zhu et al. | .................... 375/130 |
| 2002/0132586 A1 * | 9/2002 | Chen et al. | .................... 455/69 |
| 2006/0098718 A1 * | 5/2006 | Sarkar et al. | ................. 375/147 |
| 2007/0015523 A1 * | 1/2007 | Prakash et al. | .............. 455/458 |

FOREIGN PATENT DOCUMENTS

| | | |
|---|---|---|
| WO | 00/57662 A1 | 9/2000 |
| WO | 0057662 A1 | 9/2000 |
| WO | 0160104 A1 | 8/2001 |
| WO | 0163808 A1 | 8/2001 |
| WO | 2005/079086 A2 | 8/2005 |

* cited by examiner

*Primary Examiner*—Chirag G Shah
*Assistant Examiner*—Amarnauth Persaud

(57) ABSTRACT

Apparatus, and an associated method, for paging an access terminal in a radio communication system. A page indication count setter selects the page indication count, i.e., the number of page indications per page, to be included in a quick page message. The set page indication count is dependent upon communication activity, e.g., the system paging load, identified by a communication activity input indicia identifier.

19 Claims, 6 Drawing Sheets

94

| # SET PIs | 1 PI/Page | 2 PIs/Page | 3 PIs/Page | 4 PIs/Page |
|---|---|---|---|---|
| 1 | 0.030303 | 0.000918 | 2.78E-05 | 8.43E-07 |
| 2 | 0.060606 | 0.003673 | 0.000222612 | 1.35E-05 |
| 3 | 0.090909 | 0.008264 | 0.000751315 | 6.83E-05 |
| 4 | 0.121212 | 0.014692 | 0.001780894 | 0.000215866 |
| 5 | 0.151515 | 0.022957 | 0.003478309 | 0.000527017 |
| 6 | 0.181818 | 0.033058 | 0.006010518 | 0.001092822 |
| 7 | 0.212121 | 0.044995 | 0.009544481 | 0.002024587 |
| 8 | 0.242424 | 0.05877 | 0.014247155 | 0.003453856 |
| 9 | 0.272727 | 0.07438 | 0.0202855 | 0.005532409 |
| 10 | 0.30303 | 0.091827 | 0.027826474 | 0.008432265 |
| 11 | 0.333333 | 0.111111 | 0.037037037 | 0.012345679 |
| 12 | 0.363636 | 0.132231 | 0.048084147 | 0.017485144 |
| 13 | 0.393939 | 0.155188 | 0.061134764 | 0.024083392 |
| 14 | 0.424242 | 0.179982 | 0.076355845 | 0.032393389 |
| 15 | 0.454545 | 0.206612 | 0.09391435 | 0.042688341 |
| 16 | 0.484848 | 0.235078 | 0.113977238 | 0.055261691 |
| 17 | 0.515152 | 0.265381 | 0.136711467 | 0.07042712 |
| 18 | 0.545455 | 0.297521 | 0.162283997 | 0.088518544 |
| 19 | 0.575758 | 0.331497 | 0.190861786 | 0.109890119 |
| 20 | 0.606061 | 0.367309 | 0.222611793 | 0.134916238 |
| 21 | 0.636364 | 0.404959 | 0.257700977 | 0.163991531 |
| 22 | 0.666667 | 0.444444 | 0.296296296 | 0.197530864 |
| 23 | 0.69697 | 0.485767 | 0.33856471 | 0.235969344 |
| 24 | 0.727273 | 0.528926 | 0.384673178 | 0.279762311 |
| 25 | 0.757576 | 0.573921 | 0.434788658 | 0.329385347 |
| 26 | 0.787879 | 0.620753 | 0.489078109 | 0.385334268 |
| 27 | 0.818182 | 0.669421 | 0.54770849 | 0.448125128 |
| 28 | 0.848485 | 0.719927 | 0.61084676 | 0.51829422 |
| 29 | 0.878788 | 0.772268 | 0.678659877 | 0.596398074 |
| 30 | 0.909091 | 0.826446 | 0.751314801 | 0.683013455 |
| 31 | 0.939394 | 0.882461 | 0.82897849 | 0.77873737 |
| 32 | 0.969697 | 0.940312 | 0.911817904 | 0.884187058 |
| 33 | 1 | 1 | 1 | 1 |

FIG. 3

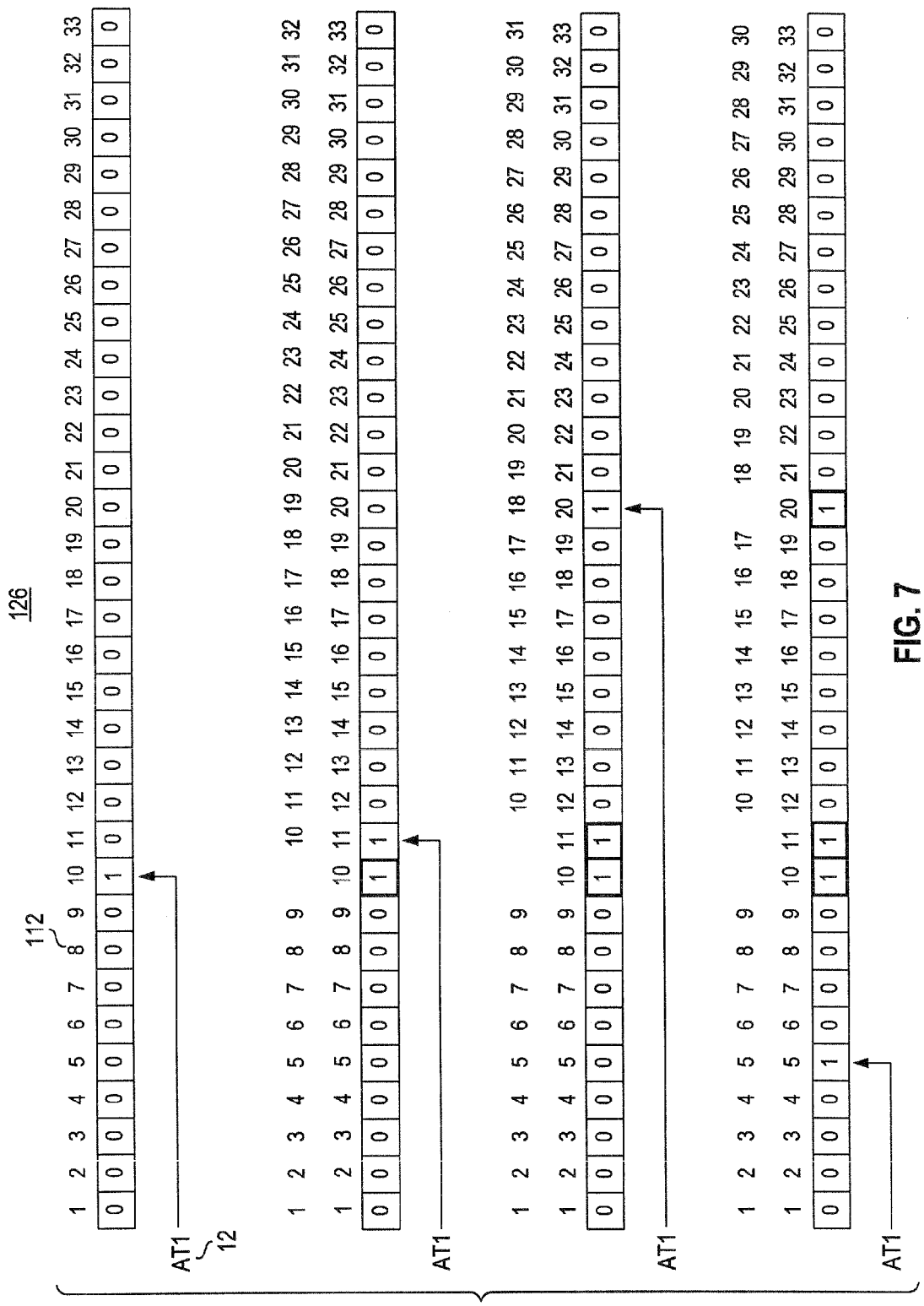

US 7,742,441 B2

APPARATUS, AND ASSOCIATED METHOD, FOR SETTING THE NUMBER OF PAGE INDICATIONS PER PAGE TO BE INCLUDED IN A QUICK PAGE MESSAGE

The present invention relates generally to a manner by which to page an access terminal of a radio communication system to alert the access terminal of a pending call, or other communication. More particularly, the present invention relates to apparatus, and an associated method, that provides for the setting of the number of page indications per page to be included in a quick page message that is sent upon a paging channel, such as a QPCH (quick paging channel) defined in an exemplary cellular communication system. The number of page indications is selected to minimize the likelihood of occurrence of false wakeup of an access terminal. Excessive battery depletion, as a result of false wakeup of the access terminal, is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also provides the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard that defines a quick paging channel (QPCH) available upon which to broadcast access-terminal pages by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal by reducing the battery consumption of the battery of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH that contains quick page indicators. The quick page message includes a number of quick page indicator slots populated with quick page indicators.

During operation, a mobile station hashes to a quick page indicator location, i.e., slot, within the quick page message based upon a session seed, a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In the existing scheme, however, the access terminal is susceptible to the occurrence of a false wakeup, that is, the access terminal does not enter into a sleep state but, rather, the access terminal enters into an active state to monitor the regular control channel for reception of regular control channel MAC messages even though there shall be no message for the access terminal. Because the communication system is a multi-user system, there is a possibility that another access terminal that is being paged has its page indication hashed to the same page indication slot. As the number of access terminals that are paged in a system increases, the likelihood of occurrence of a false wakeup correspondingly increases.

If a manner could be provided by which to reduce the occurrence of false wakeups, improved battery longevity of the access terminal would be possible.

It is in light of this background information related to paging by an access network of an access terminal that the significant improvements of the present invention have evolved.

BRIEF DESCRIPTION OF THE DRAWINGS

FIG. 3 illustrates an exemplary table stored at a storage element of the quantity determiner and accessed during operation of an embodiment of the present invention.

FIG. 7 illustrates formation of an exemplary quick page message pursuant to operation of another exemplary embodiment of the present invention.

DETAILED DESCRIPTION

Figure 1:
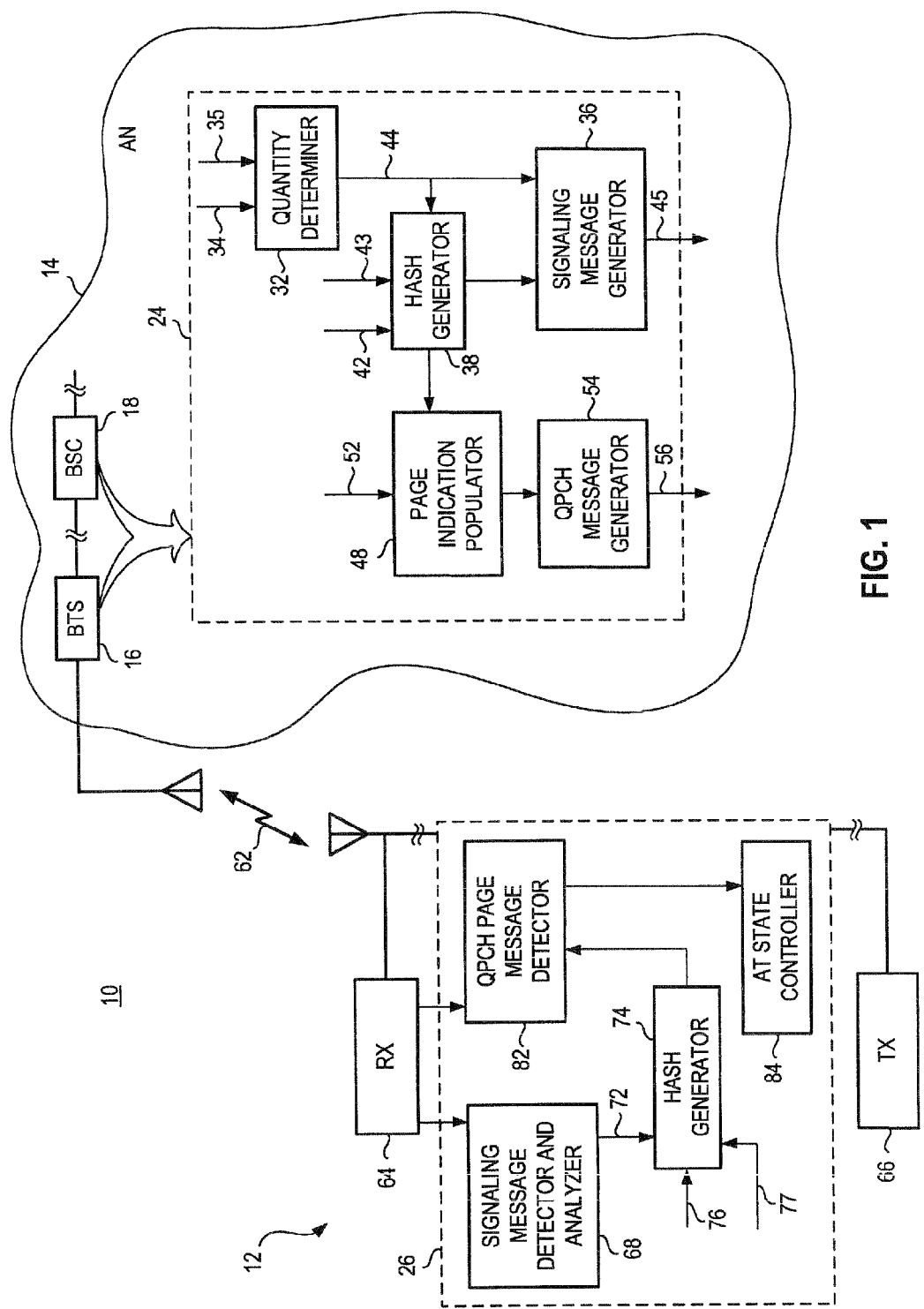
FIG. 1 illustrates a functional block diagram of a radio communication system in which an embodiment of the present invention is operable.

The present invention, accordingly, advantageously provides apparatus, and an associated method, by which to facilitate paging of an access terminal of a radio communication system to alert the access terminal of a pending call, or other communication.

Through operation of an embodiment of the present invention, a manner is provided to set the number of page indications per page to be included in a quick page message, such as a quick page message generated and sent upon a QPCH (Quick Paging Channel) defined in a CDMA2000 EV-DO cellular communication system.

Selection of the number of page indications per page is made to minimize best the possibility of occurrence of a false wakeup. By reducing the likelihood of occurrence of false wakeup, excessive battery depletion that occurs as a result of false wakeup is less likely to occur.

In one aspect of the present invention, the selection of the number of page indicators per page is made by forming quantification of false wakeup probabilities for various combinations of communication activity parameters and page indications per page for a quick page message of a selected number of page indication locations. Results of the calculations performed upon each of the various combinations of values are compared. The combination that provides a value indicative of a best false wakeup probability, e.g., is of a lowest value, is used to set the number of page indications per page that shall be used in a quick page message.

The calculations are performed iteratively by a processing device, and once all of the calculations have been made, the comparison is made, and the selection of the number of page indications per page is then made. Alternately, values representative of the results of such calculations are stored in a look-up table, and the values stored in the look-up table are accessed and used in the selection of the number of page indications per page that are to be used in a quick page message. And, once selected, the number that is set is used pursuant to formation of the quick page message.

In another aspect of the present invention, the numbers of page indications per page that is set is included in a message that is generated at the access network and broadcast to an access terminal, thereby to inform the access terminal of the number of page indications per page that shall be included in a quick page message.

In another aspect of the present invention, hashing is performed at both an access network and at an access terminal using the same input number, such as a session seed defined in the CDMA2000 EV-DO operating specification standard or other pseudorandom number, or another input number, such as an access terminal identifier (ATI). Hashing is performed upon the input number in the same manner, independently, at the access network and at the access terminal. Multiple hashes are formed by hashing the input number in different manners, e.g., such as by rotating the bit sequence of the input number to create different hash values. The number of hash values that are generated corresponds, or is otherwise responsive to, the set number of page indications. Alternately, different hash functions are used to create the different hashes. Formation of the multiple hashes is sometimes referred to herein as multi-hashing. Each hash function operation is carried out in the same manner at the access network and at the access terminal so that the resultant hash values generated at the respective entities are identical. For instance, hashing is first performed at both the access network and at the access terminal upon the input number in non-rotated form. Then, the hashing is performed, again at both the access network and at the access terminal, upon the input number whose bits are rotated by a first number of bits. If additional hashing is performed, the access network and the access terminal both perform the hashing upon the input number, whose bits are further rotated, again in the same manner at the access network and at the access terminal. Bit rotation also decorrelates the hashed values.

In a further aspect of the present invention, the hashing is performed upon the input number by operation of a hash function, or algorithm, upon the input number. The hash function, e.g., is time-varying or otherwise, in some manner, generates hash values that are time-dependent. And, if multiple hash values are generated, viz. when the set number of page indications per page is two or more, the hash values are further caused to be dissimilar. That is to say, when multiple hash values are generated, a later-generated hash value is caused to be of a value different than any earlier-generated hash value.

In another aspect of the present invention, the access network identifies the number of hashes and the number of page indications per page that are to be included in a quick page message to page a particular access terminal. A signaling message is generated that includes an indication of the number of hashes or page indications per page that are going to be broadcast by the access network to a particular access terminal within a paging message. The access terminal, from this signaling message, ascertains the number of page indications that are going to be directed to the access terminal in the quick page message. Responsive to this received number, the access terminal performs hashing upon an input number to form an appropriate number of hash values, and such hash values are used pursuant to analysis of the page message, when received, to identify where in the page message to detect values of page indicators.

In another aspect of the present invention, the number of hashes performed by the access network and, correspondingly, the number of hashes performed at the access terminal, is a selectable number, selected to minimize the likelihood of occurrence of false wakeup. The number is selected, at least in part, based upon the number of pages that are to be made to other access terminals. And, more generally, the number of hashes is responsive to communication activity in the communication system. When many access terminals are paged, the number of page indications, and hash values, per access terminal is, e.g., a small value. And, conversely, when only a small number of access terminals are to be paged, the number of page indications, and hash values, is, e.g., large. Generally, the number of hash values and resultant page indications per access terminal, populated into a page message for a particular access terminal, is inversely proportional to the communication activity, that is, the number of other pages that are made to other access terminals during a particular period of operation of the communication system. Ideally, the number of page indications and hash values per access terminal is chosen in a way to minimize the probability of false wakeup.

In another aspect of the present invention, the hash values determine where in the page message that the page indications are populated. The hashing performed at the access network and at the access terminal are carried out in the same manners. The page indication locations of a page message in which the page indication values are populated are the same hash values that are generated at the access terminal, and the access terminal detects and analyzes the corresponding page indication locations of the page message, once received at the access terminal.

In another aspect of the present invention, in the event that any of the values of the page indications populating the page indication locations corresponding to the hash values indicate that the access terminal is not being paged, the access terminal enters into a sleep state. For instance, if the access terminal detects any page indication value to which the access terminal hashes and determines the access terminal is not being paged, the access terminal enters into a sleep state. Thereby, the access terminal is more quickly able to enter into a power-saving, sleep mode. Conversely, if the access terminal identifies a page indication value populating a page indication location that indicates that the access terminal is being paged and the access terminal knows that multiple page indications are broadcast to the access terminal in the quick page message, the access terminal monitors for the same page indication value in another page indication location to which the access terminal hashes. If the first positive indication is a false indication, monitoring of a second, or other, page indication locations prior to determining finally that the access terminal is being paged reduces the likelihood of occurrence of false wakeup. Thereby, the access terminal does not enter into an active state to receive a communication responsive to a false wakeup indication. Improved power consumption characteristics of the access terminal result, providing better battery longevity.

In these and other aspects, therefore, apparatus, and an associated methodology, is provided for selecting, at a communication network, a page indication count of page indications per page to be included in a first page message. A communication activity input indicia identifier is configured to identify communication activity input indicia of the communication network. A page indication count setter is adapted to receive indication of identification by the communication activity input indicia identifier of the communication activity input indicia. The page indication count setter is configured to select the page indication count in the first page message. Selection made by the page indication count setter is responsive, in part, to the communication activity input indicia.

In these and further aspects, therefore, further apparatus, and an associated methodology, is provided for an access terminal that monitors a first channel for reception of a first message. A first message content detector is configured to detect the first message, when delivered at the access terminal. The first message includes a page indication count of page indications. A hasher is configured to generate a selected number of hash values. The selected number of hash values is responsive to the page indication count.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, the access terminal is alerted, by broadcast of page messages when a communication, initiated at the network, is to be terminated at the access terminal. A quick paging channel (QPCH), or analogous channel, is defined. Quick page indications, populating a quick page message, are of values that identify whether an access terminal is being paged. However, also as noted previously, particularly during times of heavy usage, a false wakeup of the access terminal might occur due to a quick page indication in the message intended for one access terminal is broadcast within a slot that is also used by another of the access terminals. False wakeup prevents an access terminal from entering into a power-saving sleep mode.

Accordingly, pursuant to an embodiment of the present invention, the access network includes apparatus 24, and the access terminal includes apparatus 26, that operate to reduce the likelihood of the occurrence of false wakeup. The elements of the apparatus 24 and the apparatus 26 are functionally represented, implementable in any desired manner, including, for instance, by algorithms executable by processing circuitry.

The elements forming the apparatus 24 are implemented at any appropriate location of the access network 14, including, as illustrated, at the BTS 16 and BSC 18 or distributed amongst such entities as well as others.

Here, the apparatus 24 includes a quantity of hashes/page indications per access terminal determiner 32. The determiner is coupled to receive, as input indicia, indications of network activity on the line 34. The network activity is quantified, for instance, in a number of page values. The network is aware, e.g., of the number of access terminals that shall be paged. Or, the number of page values comprises, e.g., an expected number of pages, an average number of prior pages, or other paging quantity indicia. The characteristics of the quick page message, viz., the number of page indication locations of the message are also made known to the determiner. Here, the line 35 is representative of such information provided to the determiner. In an exemplary implementation in which the characteristics of the message are static, the number of page indication locations, e.g., thirty-three page indication locations, is maintained at a storage element of the, or accessible by, the determiner. Responsive to the indication of the network activity, the determiner determines the number of hashes that are to be generated and the number of page indications that are to be provided pursuant to paging of an access terminal in a quick paging message. In an alternate implementation, the number of hash values is a set number, e.g., a fixed number greater than one. The fixed number of two, e.g., appears to work well when the number of page indication locations in a quick page message is about one hundred eighty. The number of hash values and number of page indications correspond. An indication of the determined quantity is provided to a signaling message generator and to a hash generator, a "hasher", 38.

A number known to both the access network and to the access terminal, such as a session seed or other pseudorandom number, or a number such as an access terminal identifier (ATI) is provided to the hash generator, here represented by way of the line 42. The hash generator hashes the number. That is to say, a hash function is performed upon the number to generate a hash value. Different hash values are provided by, e.g., rotating the number provided to the hash generator and performing the hash function, or algorithm, thereon. Multiple hash values are generated, for instance, by operating upon multiple rotations of the number. With an ideal hash function, all values are equally likely to be generated. An exemplary hash function comprises a mathematical "modulo" operation. A time factor, known to both the access network and the access terminal, such as a system clock time, is, in one embodiment, further provided to, and used by, the hash generator in the formation of hash values. Such factor is represented by line 43 in FIG. 1.

The signaling message generator 36 to which the value determined by the determiner 32 is provided generates a signaling message, here generated upon the line 45, that identifies the quantity determined by the determiner. The signaling message is broadcast to the access terminal 12, thereby to alert the access terminal of the determined quantity. The signaling message generator may operate in conjunction with the QPCH generator and include the quantity in the QPCH message. The hash values created by the hash generator 38 are provided to a page indication populator 48. The page indication populator 48 is also provided with a network communication request, here provided by way of the line 52. The page indication populator selects page indication values depending upon whether the access terminal is to be paged. For instance, when an access terminal is to be paged, the page indication values are logical "1" values. In one implementation, all values are initially logical "0" values and then set as appropriate. The page indication values and their associated page indication locations, defined by the hash values generated by the hash generator 38, are provided to a QPCH, or other, message generator 54. The message generator forms a page message that includes a plurality of page indication locations. The page indication populator populates selected page indication locations of the message with the page indication values. The locations populated with a page indication value are determined by the hash values generated by the hash generator 38. In like manner, page indications are formed for other access terminals and hash values are generated to define at where in the page message the page indications intended for other access terminals are populated in the message generated by the message generator 54. When the resultant message is broadcast by the access network, access terminals, such as the access terminal 12, are provided with an indication of whether the access terminal is to be paged.

Transceiver elements of the base transceiver station 16 cause broadcast of the messages generated by the message generator 54 of the apparatus 24 upon a radio air interface, represented in FIG. 1 by the arrow 62. The message is delivered to the access terminal 12 as well as other access terminals within reception range of the broadcast message. The access terminal 12 includes transceiver circuitry, here represented by a receive part 64 and a transmit part 66. The receive part 64 operates to receive signals sent thereto, such as the messages generated by the apparatus 24 of the access network. And, certain of the detected signals are provided to the apparatus 26. Of significance here are detections of the signaling message generated by the signaling message generator of the access network and of the page message generated by the message generator 54.

Indications are provided to a signaling message detector and analyzer 68. The detector and analyzer operate to detect the contents of the signaling message and analyze the detected message to ascertain the number of hashes, or page indications, per access terminal indicated in the message. Indications are provided, here by way of the line 72, to a hash generator 74. The hash generator is also provided with values of the input number, here indicated to be provided by way of the line 76, known to both the access network and access terminal. The time factor, known to both the access network and access terminal is also provided to the generator 74, here represented by way of line 77. The hash generator operates in manners analogous to operation of the hash generator 38 of the access network to perform hash functions upon the input number. And, the input number provided to the hash generator corresponds to the input number provided to the hash generator 38 on the line 42. The number of hash values generated by the hash generator corresponds to the number identified by the detector and analyzer 68. Hash values created by the hash generator are provided to a QPCH (Quick Paging Channel), or other, page message detector 82. The hash values created by the hash generator identify to the page message detector which of the page indication locations that should be monitored to determine whether a page is broadcast to the access terminal. The message broadcast by the access network and detected and operated upon by the access terminal is an atomic message. That is to say, all of the bits are received in a single message. Responsive to detections made by the detector, an indication is provided to an access terminal (AT) state controller 84 to control the state into which the access terminal is placed.

In the event that the first quick page indication slot monitored by the message detector indicates no page message broadcast to the access terminal, the state controller places the access terminal into a sleep mode. If a first of the quick page indication slots monitored by the detector indicates a page to have been broadcast, but a second of the quick page indication slots monitored by the detector indicates no page, the state controller also causes the access terminal to enter into a low-power, sleep mode. Additional page indications, if more than two, are analogously monitored. The occurrence of a false wakeup is reduced as one or more additional quick page indications are monitored to provide further indication of whether a page has been sent to the access terminal.

Figure 2:
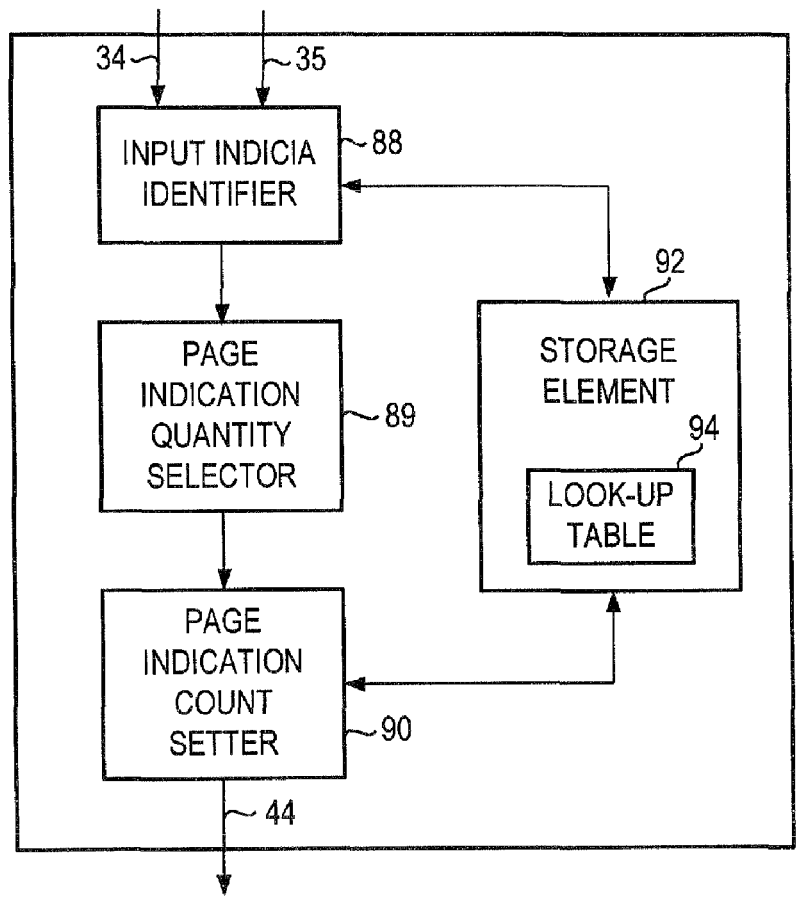
FIG. 2 illustrates a functional block diagram of the quantity determiner that forms part of the communication system shown in FIG. 1 and that operates pursuant to an embodiment of the present invention.

FIG. 2 illustrates a representation of the quantity determiner 32 that forms part of the apparatus 24 of the access network 14 shown in FIG. 1. The determiner is here shown to include an input indicia indicator 88, a page indication quantity selector 89, a page indication count setter 90, and a storage element 92. The elements of the determiner are functionally represented, implementable in any desired manner including by algorithms executable by processing circuitry.

Again, lines 34 and 35 are representative of network activity and quick page message characteristics, respectively. The indicia identifier 88 operates to detect values provided thereto, such as on the lines 34 and 35. In an implementation in which the quick page message characteristics are stored, the stored values are retrieved, such as by access to the storage element 92. The communication activity input indicia, e.g., forms a value that identifies the number of access terminals that are being paged, or shall be paged, within a selected period. And, the number of page indication locations of a quick page channel message forms, e.g., a number, such as thirty-three.

Indications of the communication activity input indicia identified by the identifier is provided to the page indication count setter by way of a page indication quantity selector 89. The page indication quantity selector here operates to select a quantity of page indications included in the first quick page message responsive to the input characteristics identified by the identifier 88. If, for instance, sixteen access terminals are being paged, the number of page indications that are included in the quick page message would be related thereto, perhaps a lower value due to collisions between page indications generated for different access terminals.

And, when applied to the page indication count setter, the indications of the input indicia, or the page indication quantity selected by the selector is used to select the number of page indications per page that shall be included in the quick page message. In one implementation, the count setter includes a calculator that operates to calculate false wakeup probabilities according to the formula:

$$F=(b/n)^p$$

wherein:
- F is the false wakeup probability;
- b is the number of set page indications (PIs);
- n is the number of bits available for paging indicators; and
- p is the number of page indications per page.

By way of an example, the quick page message includes thirty-three bits available for page indications, and sixteen access terminals are being paged. For a scenario in which one page indication per page is provided, the number of page indications that would be set is, e.g., thirteen, here representing three collisions in which more than one access terminal hashes to the same page indication in the quick page message. In this example, the false wakeup probability is 0.3939. By way of another example, of two page indications per page, twenty page indications are set. Again, the quick page channel includes thirty-three page indication locations. Performing the same calculation in this example, the false wakeup probability is 0.3673. Other combinations of values produce other calculated values of false wakeup probabilities. Upon completion of the calculations, the results are compared. The values that produce the smallest false wakeup probability is identified. And, the number of page indications per page associated with the identified, lowest false wakeup probability value is selected as the number of page indications per page to be used. Such value is generated on the line 44, as described previously.

In another implementation, alternately, the calculations for a plurality of possible combinations are pre-calculated and stored at a look-up table 94 contained at the storage element 92. The contents of the look-up table are accessed, and comparisons are made between different values stored thereat, all to determine the number of page indications per page that shall be included in the quick page channel message.

FIG. 3 illustrates an exemplary table 94, exemplary of a look-up table stored at the storage element 92 and accessed by the page indication count selector to select the number of page indications per page that shall be used in a quick page channel message. The look-up table includes a plurality of columns, each indexing different numbers of page indications per page. And, the look-up table includes a plurality of rows, each identifying a number set of page indications. Comparison and selection of the number of page indications per page that shall be used in the subsequently-generated quick page message.

Figure 4:
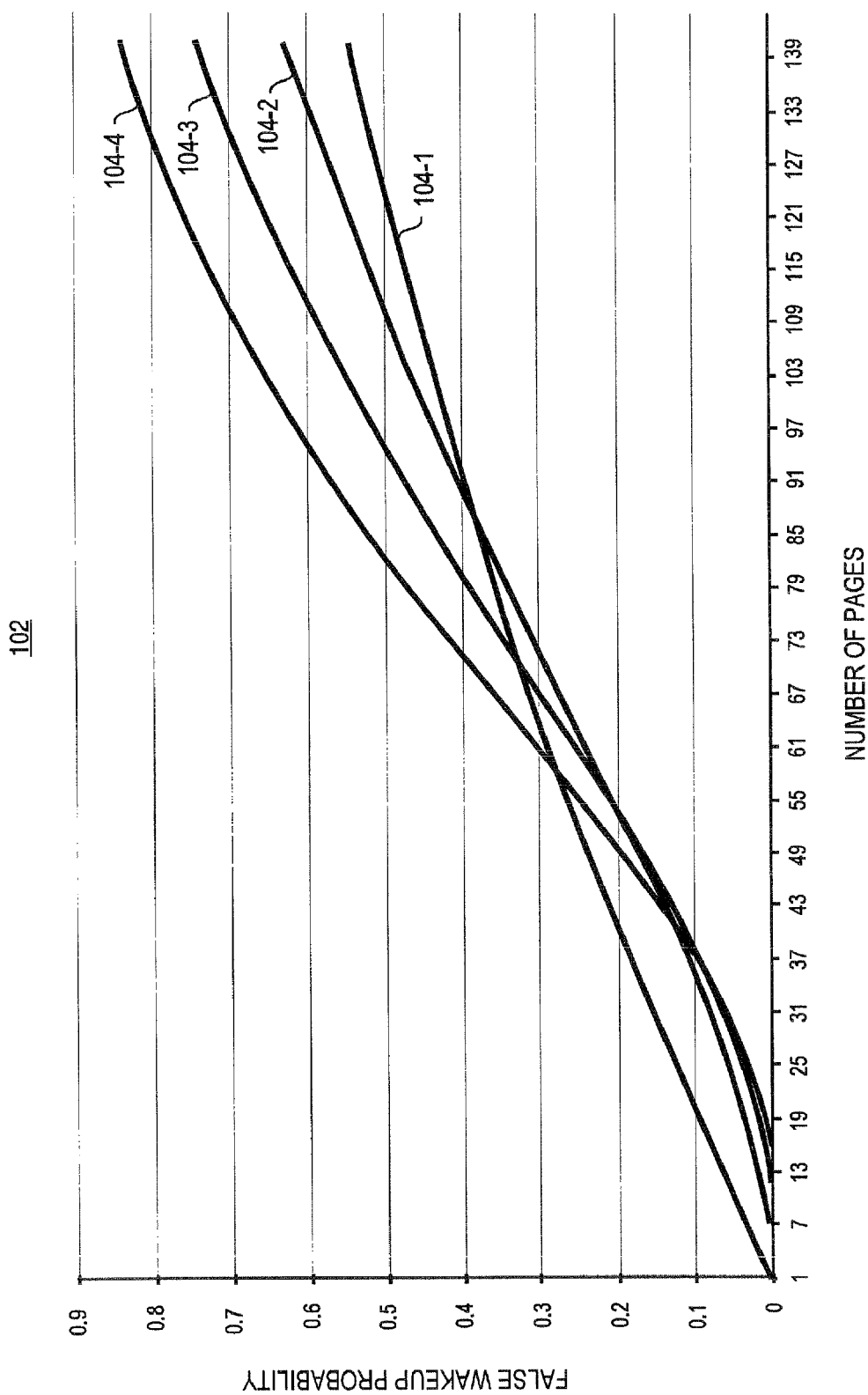
FIG. 4 illustrates a graphical representation of the relationship between the probability of occurrence of a false wakeup as a function of the number of pages in a multi-user communication system for various numbers of hashes.

FIG. 4 illustrates a graphical representation, shown generally at 102, that shows the relationship between the occurrence of false wakeup and the number of pages in the communication system 10 shown in FIG. 1, pursuant to exemplary operation. Plots 104 illustrate the general proportional relationship between the number of pages to access terminals in a multi-user communication scheme and the occurrence of false wakeup, represented in terms of probability. Four plots, plots 104-1, 104-2, 104-3, and 104-4, are shown. The plot 104-1 is representative of the relationship when a single page indication is provided to a particular access terminal in a page message to alert the access terminal of the page. A single hash value is generated, and the page indication is populated in a single page indication location determined by the single hash value. The plot 104-2 is representative of two page indication bits provided in the page message to alert a particular access terminal of the page. Two hash values are generated, and the page indication locations in which the page indications are positioned are determined by the two hash values. The plot 104-3 is representative of use of three page indications in a page message to alert a particular access terminal of the page. Three hash values are generated and their values are determinative of the positioning of the three page indication locations in which the page indications are populated. And, the plot 104-4 is representative of the relationship between false wakeup occurrence when four page indications are used in a page message to page the access terminal.

Review of the plots shows that the number of page indications in a page message that provides the lowest false wakeup probability for a given number of pages in the communication system, i.e., network activity, varies with the number of pages. Pursuant to operation of an embodiment of the present invention, advantage is taken of this relationship in the selection of the number of page indications to use per access terminal. Such selection is made, e.g., by the determiner 32 shown in FIG. 1. Selection is made in such a way as to minimize the false wakeup probability. For each number of pages, i.e., network activity, selection is made of the number of page indications that are to be used to page, in the quick page message, an access terminal. Using, for instance, plots analogous to the plots 104 shown in FIG. 2, the lowest curve for each of the number of pages, i.e., network activity, is selected. Analysis indicates that, when a number of pages is relatively small, the lowest probability of false wakeup occurs when greater number of page indications per access terminal are utilized. Conversely, at higher numbers of pages, i.e., network activity, lesser numbers of page indications provides the lowest false wakeup probabilities. Changeover occurs at various thresholds, indicated in the representation of FIG. 4 when plots cross one another.

Once determination and selection is made at the access network, indication of the selection is provided to an access terminal. The number of page indications, known at both the access network and at the access terminal, permits operation of the apparatus 24 and 26 in coordinated manner. In the exemplary implementation, the page indication values populating a quick page message are all received in the same message. The access terminal need not wake up at different times for separate bits as all of the bits of the message are received at once in the same message. Furthermore, the same page indicator values are hashed instead of, as previously utilized, making divisions into multiple physical groups. And, the page indication locations defined by the hash values are further able to be generated in a manner such that the page indication locations are dissimilar. Rotation of the input number used in the generation of the hash values decorrelates the hash values, and the introduction of time variance in the hash function also provides for hash value dissimilarity.

Figure 5:
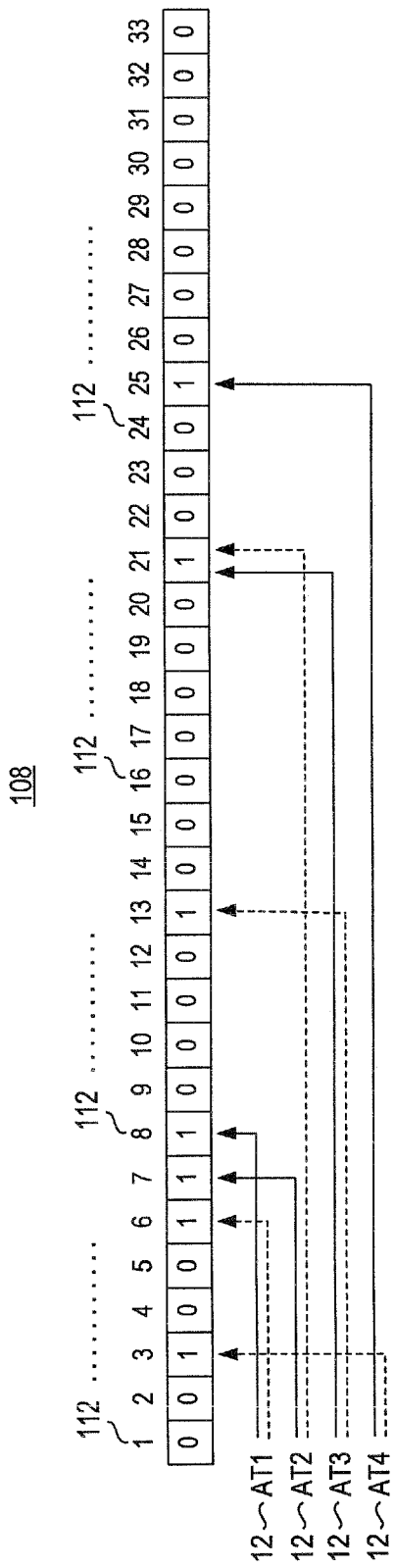
FIG. 5 illustrates an exemplary quick page message generated pursuant to operation of an exemplary embodiment of the present invention.

FIG. 5 illustrates an exemplary quick page message, shown generally at 108. The message is generated, for instance, with respect to the configuration shown in FIG. 1, at the message generator 54. The quick page message includes a plurality, here 33, page indication locations 112, numbered as 1-33. Initially, each page indication location is set to logical "0" values. Page indications for four access terminals 12, identified as AT1, AT2, AT3, and AT4, are represented in the message 108. A hash generator generates hash values of 8 and 6 for the access terminal AT1. And, page indication locations 8 and 6 are populated with values to indicate whether the access terminal AT1 is paged. Here, the logical values "1" are inserted into the page indication locations 8 and 6 that identify that the AT1 is paged. Analogously, with respect to the access terminal AT2, the hash generator generates hash values of 7 and 21, and page indications are inserted into page indication locations 7 and 21 to identify that the access terminal AT2 is paged. Hash values 21 and 13 generated with respect to the access terminal AT3 cause page indication locations 21 and 13 to be populated with page indication bits to identify, here, that the access terminal AT3 is paged. And, hash values generated with respect to the access terminal AT4 of 25 and 3 cause the page indication locations 25 and 3 to be populated with page indication bits, here again to identify that the access terminal AT4 is paged. In this implementation, any of the page indication locations of the message 108 are available to be populated with page indication bits associated with any of the access terminals. And, as indicated at the page indication location 21, a page indication location might include a page indication bit associated with more than one of the access terminals. Ideally, the hash generator generates hash values that permit even, viz. equal, distribution of page indication values across the entire message 108. Each hash for a particular access terminal hashes over the same page indication location in contrast to conventional procedures. And, through use of the time factor, the occurrence of repeated generation of hash values of similar values, and corresponding population of the same page indication locations, for a particular access terminal, is unlikely.

Figure 6:
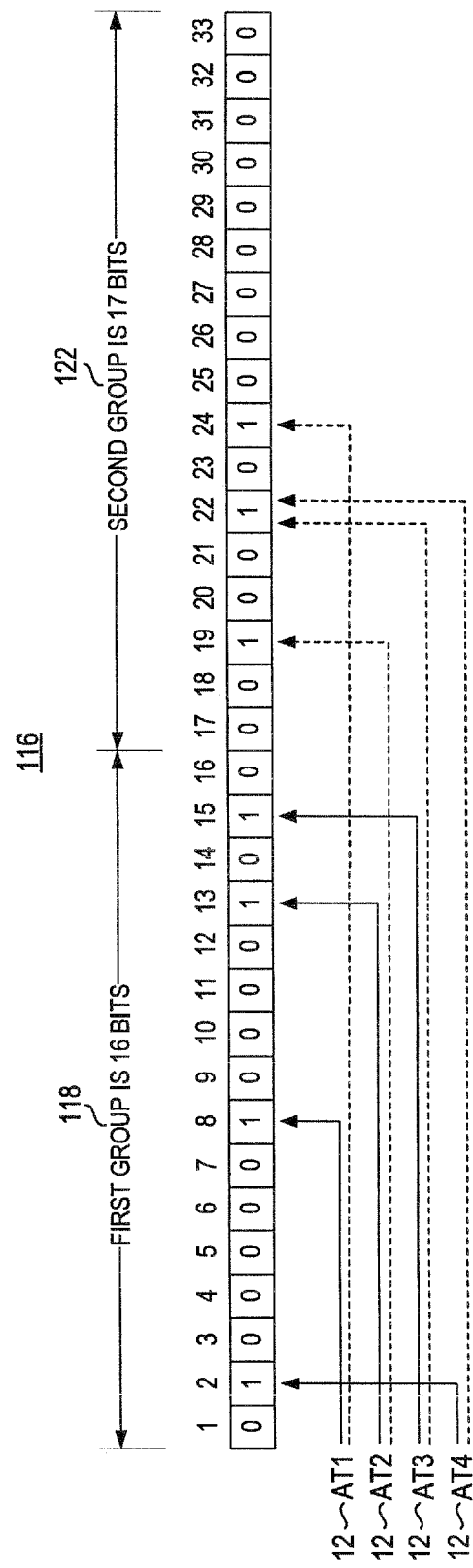
FIG. 6 illustrates an exemplary quick page message generated pursuant to operation of another exemplary embodiment of the present invention.

FIG. 6 illustrates another message, here shown generally at 116 that also includes thirty-three page indication locations 112 that are populated with page indication values, here again to page access terminals AT1, AT2, AT3, and AT4. Here, the message is divided into two groups, a first group 118, and a second group 122. Initially, here also, each page indication location is set to logical "0" values. In this implementation, only a single page indication location per group is available for page indicator values associated with a particular access terminal. That is to say, with respect to the access terminal AT1, a single page indication location in the first group is available, and a single page indication location in the second group is available. When a hash value generated by the hash value generator is of a value within the first group, another hash value must be of a value within the second group. Ideally, the hash generator generates hash values that permit even distribution of page indication values across each group of the message. And, as shown in the representation of FIG. 6, a page indication location is available to each of the access terminals in the first group and in the second group. The example shown in FIG. 6 is for an implementation in which two page indication bits are available within the page message per access terminal. If additional page indication bits are available, the page message is divided into additional numbers of groups of substantially equal size, and the page indication locations are correspondingly made available in each of the additional numbers of groups. In an implementation in which the message shown in FIG. 6 is generated, the false wakeup probability is defined by the equation:

$$F = b_1/n_1 \times b_2/n_2 \times \ldots b_n/n_n$$

in which the values of b and n change for each group 1 through n.

FIG. 7 illustrates a quick page message 126 and the manner by which a hash generator operates pursuant to another embodiment. Here, four page indication locations are made available to the access terminal AT1 over the thirty-three bits of the quick page message. And, again, each page indication location is initially set to logical "0" values. When a hash value is selected and the page indication location 112 determined therefrom is used, that page indication location is no longer available to that access terminal at which to populate the message with another page indication value. That is to say, a hash value cannot be repeated for that access terminal. In the representation shown in FIG. 5, a first page indication value is populated in page indication location 10. Here also, ideally, the hash generator generates hash values that permit even distribution of page indications across all of the available page indication locations. As noted below, when a page indication location is used, the location becomes no longer available. Page indication location 10 is no longer available for the access terminal AT1. A next-generated hash value is of 11 and a page indication bit is inserted into the page indication location 11. Thereafter, neither page indication locations 10 nor 11 are available. A subsequently-generated hash value of 20 causes the page indication value to be inserted into page indication location 20. And, thereafter, page indication locations 10, 11, and 20 are no longer available. A fourth-generated hash value of 5 is generated, and the page indication location 5 is populated with a page indication value. In this implementation, use of a time factor is generally not required.

Figure 8:
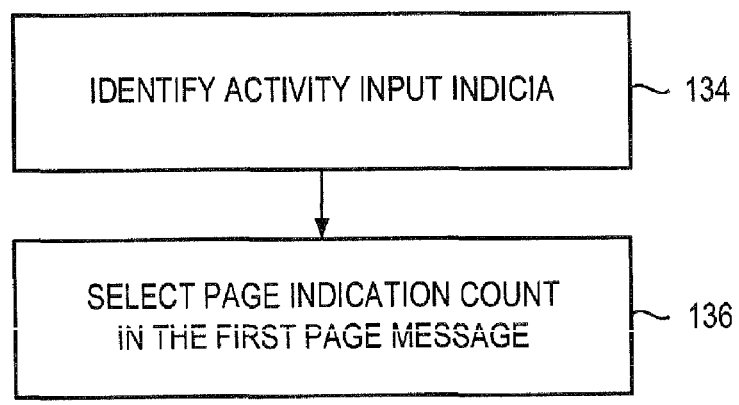
FIG. 8 illustrates a method flow diagram representative of the method of operation of an embodiment of the present invention.

FIG. 8 shows a method flow diagram, shown generally at 132, representative of exemplary operation of an embodiment of the present invention for selecting, at a communication network, a page indication count of page indications per page to be included in a first page message.

First, and as indicated by the block 134, communication activity input indicia of the communication network is identified. Then, and as indicated by the block 136, the page indication count in the first page message is selected. The selection is responsive, in part, to the communication activity input indicia that has been identified.

Thereby, through operation of an embodiment of the present invention, an access terminal is able better, and quickly, to determine whether a page is broadcast thereto. If a quick page message, page indication location to which the access terminal hashes fails to include an indication that the access terminal is being paged, the access terminal enters into a reduced power state. The occurrence of false wakeup is less likely to occur due to the selection of page indications per page that minimizes the occurrence of false wakeup of an access terminal.

The previous descriptions are of preferred examples for implementing the invention, and the scope of the invention should not necessarily be limited by this description. The scope of the present invention is defined by the following claims.

What is claimed is:

1. Apparatus for selecting, at a communication network, a page indication count of page indications per page to be included in a first page message, said apparatus comprising:
a communication activity input indicia identifier configured to access a storage element to identify communication activity input indicia indicative of communication activity of the communication network; and
a page indication count setter configured to receive indication of identification by said communication activity input indicia identifier of the communication activity input indicia, said page indication count setter configured to select the page indication count of page indications per page in the first page message, selection made by said page indication count setter responsive, in part, to the communication activity input indicia and to numbers of page indication locations populated for various values of page indications per page.

2. The apparatus of claim 1 wherein the communication activity input indicia comprises a quantity quantifying paging activity in the communication network.

3. The apparatus of claim 2 wherein the quantity that quantifies the paging activity in the communication network comprises a value representative of a number of access-terminal pages to be broadcast by the communication network within a selected period.

4. The apparatus of claim 1 further comprising a page indication quantity selector configured to receive indication of identification by said communication activity input indicia identifier of the communication activity input indicia, said page indication quantity selector configured to select a quantity of page indications included in the first page message, the quantity of page indications selected by said page indication quantity selector related to the communication activity input indicia.

5. The apparatus of claim 1 wherein the first page message is of a selected message length defined by a selected number of page indication locations, and wherein the page indication count selected by said page indication count setter is further responsive to the selected message length of the first page message, and wherein the page indication count represents a count of a predetermined binary bit for population into at least one page indication location.

6. The apparatus of claim 5 further comprising a message length identifier configured to identify the selected message length of the first page message.

7. The apparatus of claim 6 wherein the selected message length identified by said message length identifier comprises a set value.

8. The apparatus of claim 1 wherein said page indication count setter comprises a calculator that performs calculations, results of which are used to select the page indication count.

9. The apparatus of claim 8 wherein calculations performed by said calculator comprise iterative operations upon variables including a variable representative of the communication activity input indicia.

10. The apparatus of claim 1 wherein said page indication count setter comprises a storage element configured to include a table containing a plurality of stored values, the stored values indexed at least in terms of a representation of the communication activity input indicia and available page indication counts.

11. The apparatus of claim 1 further comprising a page indication count message generator configured to generate a send message that includes a value representative of the page indication count.

12. The apparatus of claim 11 wherein the send message generated by said page indication count message comprises part of the first page message.

13. The apparatus of claim 1 wherein selection made by said page indication count setter is dependent solely upon a value representative of the communication activity input indicia.

14. Apparatus for an access terminal having a receiver that monitors a first channel for reception of a first message, said apparatus comprising:
 a first message content detector coupled to the receiver and configured to detect the first message, when delivered to the access terminal, the first message including a page indication count of page indications per page, the page indication count responsive to a communication activity input indicia indicative of communication activity and to numbers of page indication locations populated for various values of page indications per page; and
 a hasher configured to generate a selected number of hash values, each hash value identifying a page indication location and the selected number of hash values responsive to the page indication count.

15. A method for selecting, at a communication network, a page indication count of page indications per page to be included in a first page message, said method comprising the operations of:
 identifying communication activity input indicia indicative of communication activity of the communication network; and
 selecting, by a page indication quantity selector, the page indication count of page indications per page in the first page message, selection responsive, in part, to the communication activity input indicia identified during said operation of identifying indicia and to numbers of page indication locations populated for various values of page indications per page.

16. The method of claim 15 wherein the communication activity input indicia identified during said operation of identifying comprises a value representative of a number of access terminal pages to be broadcast by the communication network within a selected period.

17. The method of claim 15 wherein the first page message is of a selected message length defined by a selected number of page indication locations and wherein the page indication count selected during said operation of selecting is further responsive to the selected message length, and wherein the page indication count represents a count of a predetermined binary bit for population into at least one page indication location.

18. The method of claim 15 wherein said operation of selecting selects the page indication count to minimize occurrence of false wakeup pursuant to communication of the first page message.

19. The method of claim 15 further comprising the operation of generating a send message, the send message including a representation of the page indication count selected during said operation of selecting.

\* \* \* \* \*